W. O. RUST.

Saw Set.

No. 11,569.

Patented Aug. 22, 1854.

UNITED STATES PATENT OFFICE.

WILLIAM O. RUST, OF GREAT FALLS, NEW HAMPSHIRE.

SAW-SET.

Specification of Letters Patent No. 11,569, dated August 22, 1854.

*To all whom it may concern:*

Be it known that I, WILLIAM M. O. RUST, of Great Falls, in the county of Stafford and State of New Hampshire, have invented a new and useful Improvement in Saw-Sets; and I do hereby declare that the same is fully described and represented in the following specification and the accompanying drawings, letters, figures, and references thereof.

Figure 1:
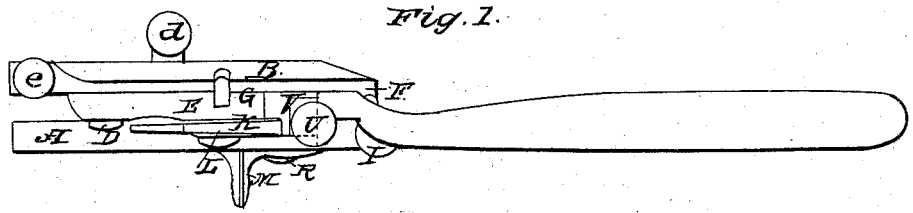
Figure 2:
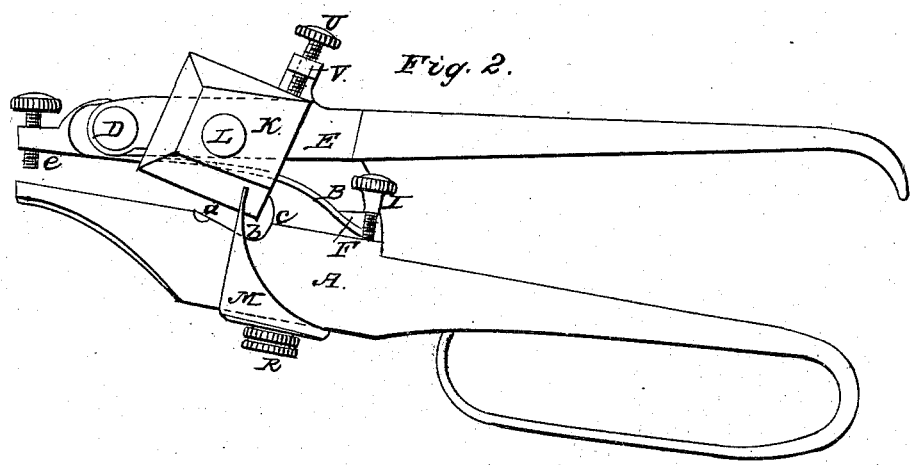
Figure 3:
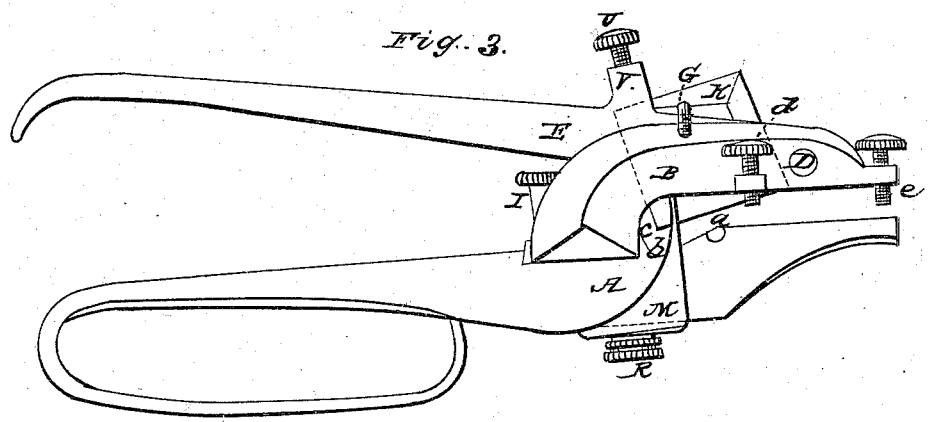

Of the said drawings, Figure 1, represents a top view of my improved saw set. Figs. 2 and 3, are elevations of opposite sides of it.

In the said drawings A, denotes the bed holder which carries the angular bed $a$, $b$, $c$, on and over which the saw is placed during the act of setting its teeth. From the holder and back of the bed an arm B, extends upwards and above the holder and is made to carry two screws $d$, $e$, as seen in the drawings. This arm serves to support the fulcrum pin D, of the movable part E, which is arranged over the bed holder and is pressed upward by a spring F, disposed as seen in the drawings. The upward movement of the movable lever E, being regulated by a back stop screw G, which is screwed into the aforesaid arm and is made to project over the movable lever as seen in the drawings. The extent of downward motion of the lever is determined by an adjusting top screw, I, that is screwed into the bed holder. The said movable lever is made to carry between its fulcrum and the last mentioned top screw what may be termed a rotary bender, which consists of a square or polygonal piece of metal, K, made to rotate on a pin, L, projected from the side of the movable lever. This bender is reduced on each of its edges or is chamfered down on its sides so as to bring the edges of different widths. This bender is arranged directly over the bed or the part, $b$, $c$, of it as seen in the drawings; and to such bed or part $b$, $c$, there is adapted a sliding stop gage, M, so applied to the bed holder as not only to be capable of being moved longitudinally thereon either toward or away from the vertex, $b$, of the bed, $a$, $b$, $c$, but of being confined in position by means of a set screw R.

During the operation of the setting of the teeth of the saw, the blade of the saw is made to rest upon the part, $a$, $b$, of the bed and with the points of its edge against the movable gage; the screws of the bent arm serving to hold the saw down or prevent it from springing upward during the operation of bending a tooth of it, such operation being effected by moving the lever downward so as to carry the turning bender into contact with the saw tooth to be bent, and with pressure sufficient to bend the saw tooth down to the angle required; such angle of the tooth with respect to the blade being determined by a regulating screw, U, which works through a projection, V, of the movable lever and is placed over the movable bender so as to serve as a stop thereto.

By means of the rotary bender and its regulating screw, the saw set may be adapted to a saw of any size capable of being inserted in and bent by the machine. A saw set thus provided being what may be termed a universal saw set: The application or manner of using it will readily be comprehended by those who are in the habit of using a saw set.

The regulating back stop of the movable lever is of considerable importance as by means of it we are enabled to adjust the return movement of the lever so as to bring the bending edge of the rotary bender close down to the saw in order that there may not be any more downward motion of the movable lever to effect the bending of the saw tooth than may be necessary.

1. I claim the rotary bender and its adjusting screw in their combination with the movable lever.

2. I also claim the arrangement of the regulating back stop on the stationary arm so that it may be used in connection with the movable lever and for the purpose as specified.

In testimony whereof I have hereunto set my signature this thirteenth day of July, A. D. 1854.

WILLIAM O. RUST.

Witnesses:
 CALEB EDDY,
 F. P. HALE, Jr.